United States Patent [19]

Rettig

[11] 3,992,795

[45] Nov. 23, 1976

[54] STICK-ON TELEPHONE NUMBER REFERENCE LIST HOLDER FOR HANDSETS

[76] Inventor: John F. Rettig, 2681 Murray Ridge Road, San Diego, Calif. 92123

[22] Filed: May 16, 1975

[21] Appl. No.: 578,167

[52] U.S. Cl. ............................................... 40/338
[51] Int. Cl.² ........................................... G09F 3/00
[58] Field of Search ........................... 40/336–339, 40/10 R, 10 D, 31–32, 64 R, 65, 63 R, 106.1, 124, 124.2, 152, 158 B, 159, 128, 104.17, 104.18, 104.19, 125 A; 281/15 R, 15 B

[56] References Cited
UNITED STATES PATENTS

| | | |
|---|---|---|
| 2,421,503 | 6/1947 | Hermon ............................ 40/104.19 |
| 2,788,592 | 4/1957 | Alexander ............................. 40/338 |
| 3,120,066 | 2/1964 | Reeves ................................. 40/31 X |
| 3,309,805 | 3/1967 | Thomas .............................. 40/159 X |
| 3,350,806 | 11/1967 | Davenport ..................... 281/15 R X |

*Primary Examiner*—Louis G. Mancene
*Assistant Examiner*—John H. Wolff

[57] ABSTRACT

A telephone number reference holder is provided for adhesive attachment to the upper flat surface of the handset of a conventional desk or wall telephone, whereby a plurality of telephone numbers can be written on cards individually inserted in separate pockets in the holder for instant visibility and use by the telephone user, and individually replaced when the necessity arises.

1 Claim, 4 Drawing Figures

STICK-ON TELEPHONE NUMBER REFERENCE LIST HOLDER FOR HANDSETS

BRIEF SUMMARY OF THE INVENTION

This invention concerns a telephone number reference list holder, and more particularly to such a holder that can be adhesively attached to the upper flat surface of the conventional handset of a telephone for ready reference without requiring structural change to the telephone.

It is well known to associate a telephone number list to a telephone. Some of the patented inventions require a structural change to the existing telephone set, such as U.S. Pat. No. 2,788,592. Other telephone indexes rely upon a structural part of the telephone having a particular design, such as one having pushbuttons for intercommunications. Still other patented constructions require rigid, clip-on frames that have a tendency to interfere with normal usage of the telephone, and which are not readily visible when the telephone is not in use.

OBJECTS OF INVENTION

A principal object of this invention is to provide a telephone number reference list holder for conventional telephones that is simple in construction, and which can be readily attached to the handset for instant reference and use.

Another important invention object is to provide such a holder that can be easily attached without tools to the handset of a telephone without requiring any structural change thereto, and which feel comfortable to the user.

Still another object is to provide such a holder that contain a plurality of telephone numbers that can be changed individually, and readily kept current.

IN THE DRAWING

DETAILED DESCRIPTION

Figure 1:
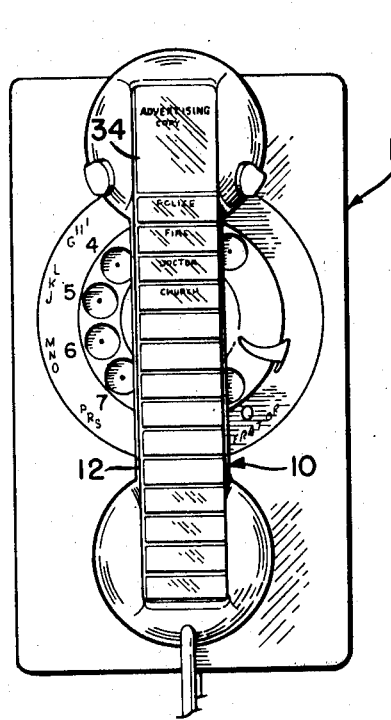
FIG. 1 shows the novel telephone number index holder attached to the upper flat surface of a handset of a wall type telephone.
Figure 2:
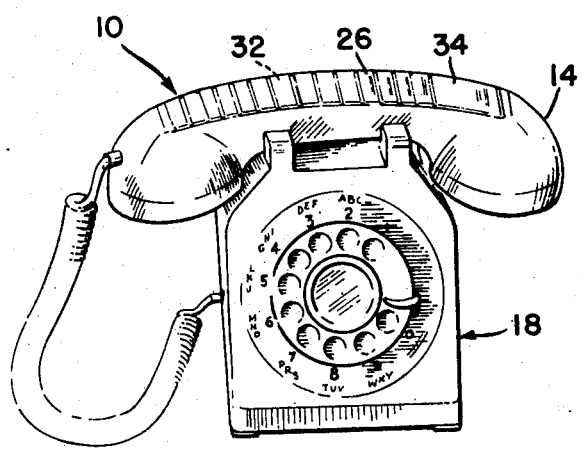
FIG. 2 shows the novel holder attached to the handset of a desk type telephone.

Referring to the drawing where like reference numerals refer to similar parts throughout the figures, there is shown in FIGS. 1 and 2 a novel telephone number reference list holder 10 attached to the upper, flat surface of handset 12 and 14 of conventional wall and desk telephone sets 16 and 18, respectively, for instant reference and use.

Holder 10 generally comprises an elongate rectangular envelope open at one longitudinal side. The envelope is fabricated of an upper and bottom layers 20 and 22 of plastic material, the upper layer being transparent to enable the telephone numbers that are inserted in the envelope to be visible therethrough. Bottom layer 22 is preferably opaque, for example, black or any compatible color with the telephone, to provide a contrasting background to the telephone numbers.

Figure 3:
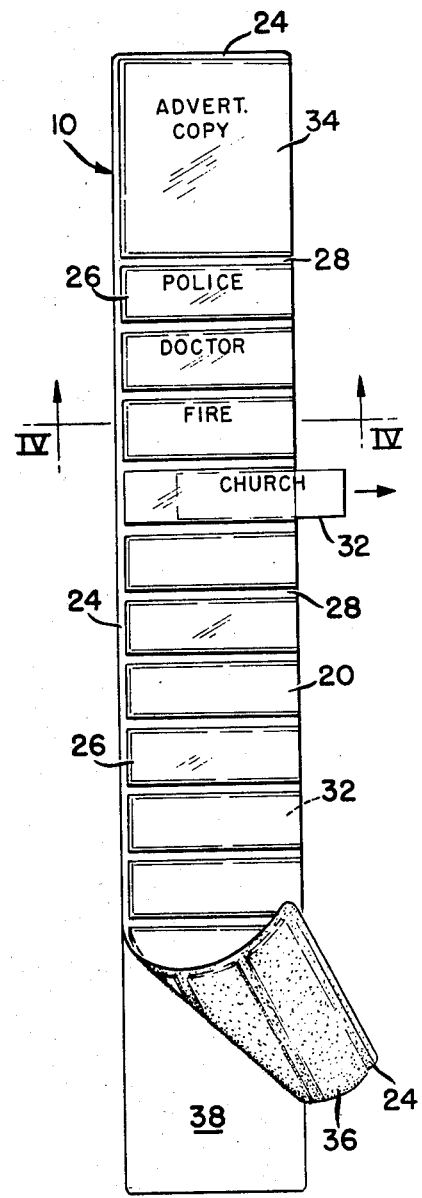
FIG. 3 is an enlarged plan view of the novel holder with a protective back sheet partially peeled back to show the adhesive layer.
Figure 4:
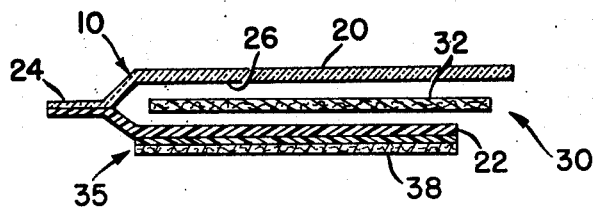
FIG. 4 is a cross-section of the holder taken along line IV—IV of FIG. 3.

One longitudinal edge of both the upper and bottom layers 20 and 22, preferably the left side as viewed in the drawing, and the upper and edges are heat sealed together as indicated at 24 in FIGS. 3 and 4. In addition, a plurality of transverse pockets 26 are formed between layers 20 and 22 by heat sealing transverse seams 28 in spaced relation along the length of the envelope.

As best shown in FIG. 3, pockets each have a side opening 30 on the right longitudinal side of the holder. A paper card insert 32, on which a pertinent telephone number may be typed or written, is individually inserted into each pockets 26. One of the pockets, such as uppermost pocket 34, may be larger to provide space for suitable advertising copy, in the event the holder is to be distributed by an associated business.

As shown in FIG. 4, upper layer 20 is preferably made wider than card 32 to protect the outer edge of the card after insertion into its respective pocket. Lower layer 22 is in turn preferably made smaller in width than card 32 to enable the card to be readily gripped by the finger nail of the user, or by any other convenient instrument, against the protruding edge of the upper layer for removal when the telephone number on the card needs changing.

Providing holder 10 with a plurality of individual pockets for each telephone number, enables a single telephone number to be changed without affecting the cards containing numbers that need not be changed. In addition, the individual pockets enable the multi-layer holder to lay flat on the flat upper surface of the handset avoiding any discomfort to, or damage to the holder, when gripped by the hand of the user.

Telephone number holder 10 is attached to the handset of the telephone by an adhesive strip 35, which consists of a layer of adhesive 36 and a wax-like protective cover 38. Strip 35 is applied to the back of lower layer 22 with cover 38 outermost.

Adhesive layer 36 has the property of greater adherence to the plastic material of layer 22 than to protective cover 38, so that cover 38 can be easily stripped off with the adhesive layer remaining on the holder for attachment to the handset in a centered position. It should be noted that holder 10 has approximately the same dimensions as the flat, slightly curved upper surface of both handset 12 and 14, namely about 1 × 7¼ inches, and the attached position does not interfere with, nor is uncomfortable in, the holding of the handset by the user.

Being on upper surface of the handset, holder 10 is not only always visible to the telephone user, but when dialing the holder can be held in a closely associated position during actual dialing, thereby minimizing the danger of dialing the wrong number, which can be a critical mistake in an emergency situation.

Accordingly, the invention provides a telephone number holder that is simple in construction, and which can be easily attached to the handset of a wall or desk type telephone in a position to be instantly visible for quick reference when the need arises. By providing individual pockets for cards containing each telephone number, the individual numbers can be changed and kept current. Furthermore, the holder lies flat against the handset and hardly noticeable by the telephone user.

I claim:

1. A telephone number reference list holder for the elongate hand portion of a telephone handset comprising:
- a elongate rectangular envelope made of flexible material having an outer transparent layer and an inner layer having the dimensions substantially that of the flat outer surface of the intermediate portion of the handset;
- a plurality of individual pockets formed in said envelope between said layers;
- each pocket having an opening at one common longitudinal side;
- a card on which may be applied a telephone number insertable in each pocket through said opening;
- said outer layer adjacent the pocket openings extending beyond said card, and said card extending beyond said inner layer to facilitate replacement of said card by the fingers of the user;
- an adhesive coating on the entire underside of said inner layer;
- a pealable protective cover for said adhesive coating;
- whereby upon removal of said protective cover the entire envelope may be adhesively mounted flatly to the outer surface of the hand portion of the telephone handset for ease of visibility and reference by the telephone user.